United States Patent [19]
Danly

[11] 3,713,194
[45] Jan. 30, 1973

[54] MILLING CUTTER FOR MACHINING SHIPS PROPELLERS AND THE LIKE

[75] Inventor: James C. Danly, River Forest, Ill.

[73] Assignee: Danly Machine Corp., Chicago, Ill.

[22] Filed: Aug. 13, 1971

[21] Appl. No.: 171,566

[52] U.S. Cl. ................................29/103 A, 29/105 A
[51] Int. Cl. .................................................B26d 1/12
[58] Field of Search..29/103 A, 103 R, 105 A, 105 R

[56] References Cited

FOREIGN PATENTS OR APPLICATIONS 896,644  5/1962  Great Britain......................29/103 A

*Primary Examiner*—Leonidas Vlachos
*Attorney*—Wolfe, Hubbard, Leydig, Voit & Osann

[57] ABSTRACT

A face mill for contour milling of ships' propellers and the like for use where the cutter axis is rocked as it is advanced along a convex surface to maintain perpendicularity with the surface, in which the cutter body has a bore surrounded by evenly spaced sockets receiving cutter inserts, an auxiliary face type milling cutter being telescoped into the bore and providing cutting edges which extend from the inner edges of the inserts substantially all the way to the axis. All of the cutting edges are precisely positioned in a common plane which is perpendicular to the axis of the tool body.

7 Claims, 5 Drawing Figures

PATENTED JAN 30 1973 3,713,194
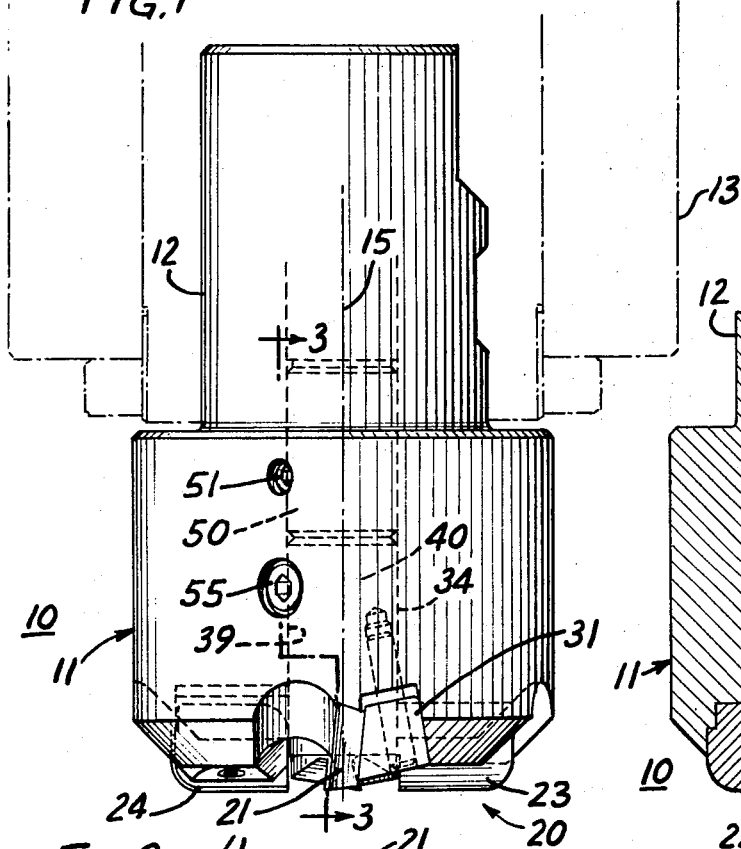
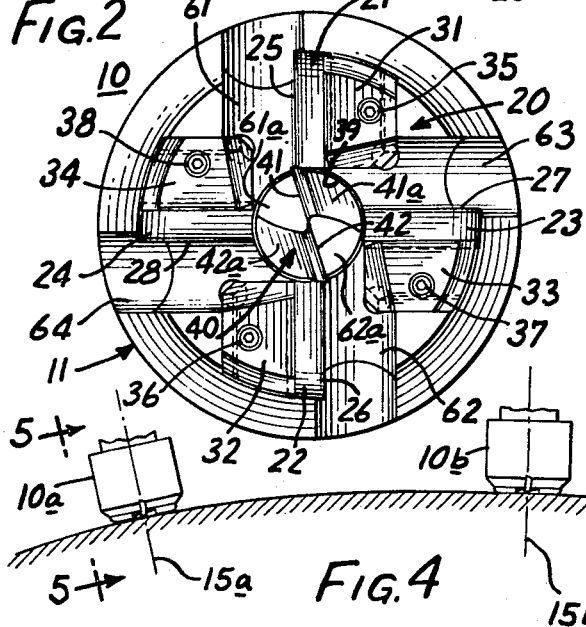
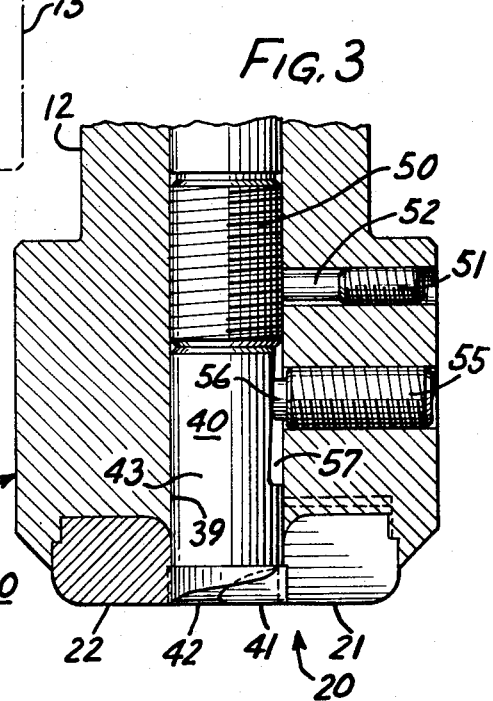
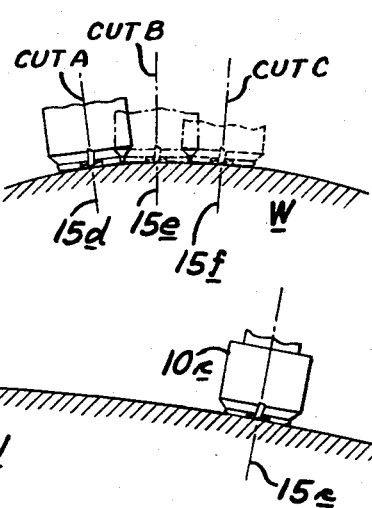
INVENTOR
JAMES C. DANLY
by Wolfe, Hubbard, Leydig, Voit & Osann, Ltd.
ATTYS

MILLING CUTTER FOR MACHINING SHIPS PROPELLERS AND THE LIKE

Conventional face mills intended for contouring and other purposes commonly include radially oriented, sharpened inserts of tungsten carbide or the like, with the cutting edges falling short of meeting the tool axis. It is found that when such a tool is rocked progressively as it travels along a convex path, in order to maintain the tool at all times perpendicular to the surface which is being generated, the effect is to leave on the work an upraised ridge of shallow arcuate section along the path of movement of the tool. The ridge, which has a width equal to the diameter of the "open" space within the tool constitutes a defect in the machinery which may be conveniently referred to as "cupping", a defect which must be laborously corrected by a subsequent machining step if a smooth surface is to be achieved.

It is an object of the present invention to provide a face mill for use in a contouring machine which produces a finished surface free of ridges or "cupping" effect. It is another object of the invention to produce a face mill having cutter inserts and employing an auxiliary milling cutter which includes provision for axial adjustment of the auxiliary cutter to achieve a coplanar relation between all of the cutting edges during the course of initial manufacture and assembly and also as subsequently required when the tool is resharpened. It is a related object to provide a novel face mill having cutting inserts and providing cutting edges which extend continuously from the periphery of the tool substantially all the way to the axis.

It is another object to provide a face mill of the above type which is strong and durable, which is capable of exerting large cutting forces and operating at high rates of speed and feed. It is a more specific object to provide a composite face mill having radial inserts of tungsten carbide or the like which terminate short of the tool axis and with the center position being occupied by an auxiliary face type milling cutter in coplanar relation to provide simultaneous cutting over the entire radius of the tool and which overcomes the problems which are encountered in the use of conventional mills having inserted cutters. It is a related object to provide in such a tool grooves ahead of the inserts and cutting edges which are respectively in radial communication for efficient disposal of chips from the axial region of the tool.

It is yet another object to provide a face mill for a contouring machine which is not only well suited for the machining of convex surfaces but which may be employed to good advantage in the machining of surfaces which are flat or slightly concaved so that all of the machinery required in a propeller or similar workpiece may be carried out without necessity for frequent tool changes.

Other objects and advantages of the invention will become apparent upon reading the attached detailed description and upon reference to the drawing in which:

FIG 1 is an elevational view of a face mill constructed in accordance with the present invention.

FIG. 2 is a lower end view of the face mill shown in FIG. 1.

FIG. 3 is a fragmentary cross section looking along the line 3—3 in FIG. 1.

FIG. 4 shows the rocking of the tool axis as the tool is advanced to develop a convex surface.

FIG. 5 is a view taken at right angles to FIG. 4, looking along the line 5—5 therein, and showing the position of the cutter in the making of successive parallel cuts.

While the invention has been described in connection with a preferred embodiment, it will be understood that I do not intend to be limited to the particular embodiment shown but intend, on the contrary, to cover the various alternative and equivalent forms of the invention included within the spirit and scope of the appended claims.

Turning now to the drawing there is shown in FIGs. 1—3 a face mill 10 constructed in accordance with the invention having a cylindrical body 11 and a shank 12, with the shank being gripped in a suitable chuck 13 which is shown in dot-dash outline.

Mounted upon the end face 20 of the tool are cutter inserts 21—24 which are formed of tungsten carbide or the like to present sharpened leading edges 25-28. These inserts are clamped in position, evenly spaced at 90°, in a set of sockets having clamping members 31-34 which are secured by clamping cap screws 35-38.

In accordance with the present invention the inserts 2-24 extend from the periphery of the tool toward the tool axis but are not extended all the way into the axis. Instead, the tool body is formed with a central bore accommodating an auxiliary face type milling cutter having cutting edges which lie in a plane and which are, in addition, coplanar with the cutting edges on the inserts 21-24. Referring to the illustrated embodiment the tool is provided with a central bore 39 into which is telescoped an auxiliary face type milling cutter 40 having edges 41, 42 which lie in a common plane as well as a shank 43. For the purpose of adjusting the auxiliary cutter endwise it is bottomed on an adjustable plug 50 which is threaded in the bore and which has provision (not shown) for manual rotation, with screwing of the plug in one direction being effective to advance the auxiliary cutter outwardly and screwing of the plug in the other direction being effective to permit the cutter to retreat inwardly. When the threaded plug is adjusted to achieve the coplanar relationship mentioned above it is held in such position by a set screw 51 having a small shoe 52 of cylindrical shape and which may be made of tough plastic such as nylon.

For the purpose of resisting the reaction force and for maintaining a desired phase relationship between the cutting edges 41,42 on the auxiliary cutter and the cutting edges 25,26 on the cooperating inserts, the auxiliary cutter is preferably keyed to the housing by means of a key in the form of a set screw 55 radially threaded into the wall of the housing and having a half dog point 56 is received in a longitudinal groove 57 formed in the wall of the shank. Keyed engagement between the dog point 56 and the groove 57 prevents relative rotation of the auxiliary cutter and, in addition, when the set screw 55 is turned tight, the auxiliary cutter is clamped securely in its working position bottomed against the end of the plug 50.

In accordance with one of the aspects of the present invention the keying is such between the auxiliary cutter 40 and the cutter body 11 that the cutting edge 41 on the auxiliary cutter forms a continuation of the cutting edge 25 on the insert 21. Similarly the cutting edge 42 on the cutter forms a continuation of the cutting edge 26 on the diametrically opposite insert 22. For the purpose of disposing of the chips which are removed by the composite cutting edge, a chip groove 61 is formed directly ahead of the insert 21 and in radial communication with a registering chip groove 61a which is formed in the auxiliary cutter directly ahead of the cutting edge 41. Diametrically opposite, chip disposing grooves 62, 62a, in communication with one another, are formed ahead of the cutting edge 42 on the auxiliary cutter and the cutting edge 26 of insert 22 mounted in the tool body. At the 90° positions chip conducting grooves 63,64 are provided for removing the chips cut by the inserts 23,24.

It will be apparent from FIG. 2 that continuous cutting edges are provided all the way from the periphery of the tool to the tool axis. Thus the edge 25 on the insert 21 extends from the periphery of the tool inwardly to substantially the periphery of the bore, while the cutting edge 41 on the auxiliary cutter extends substantially from the periphery of the bore 39 to the central axis.

It is found that using cutting edges which extend all the way from the periphery to the tool axis the tool may be rocked to maintain the tool perpendicular to a convex surface to be generated free of ridging and without the "cupping" action experienced when conventional face mills are employed for contouring purposes.

Thus referring to FIG. 4 there are shown three positions of the tool 10 as it is fed in contact with the convex surface of a propeller or similar massive workpiece W, the three positions being indicated by the reference numerals 10a, 10b, and 10c, respectively. To maintain a perpendicular relationship between the tool and workpiece, the axis 15 of the tool is progressively rocked through the positions shown as 15a, 15b and 15c. Upon completion of a single pass, the tool is moved transversly and another cut or pass is taken, the successive cuts being indicated in FIG. 5, by the legends Cut A, Cut B, and Cut C. In taking these successive cuts the axis 15 of the tool is canted transversely at different angles as indicated at 15d, 15e and 15f. By taking cuts which are closely spaced and indeed overlapping the stock is removed along ribbons which are flat in cross section but which, because of the transverse canting of the tool axis, form an extremely close approximation of the desired transverse curvature.

It is found that when the tool is cycled through successive contouring steps as shown in FIGS. 4 and 5, relatively high cutting forces may be generated, as well as high rates of speed and feed over relatively long cutting intervals without jeopardizing the tool. When using conventional designs face mills provided with radial inserts for contour machining it is found that hard usage tends to break off pieces of the carbide inserts, particularly where the inserts are extended to a point near the tool axis. The reason for such tool deterioration is not fully understood. It is considered likely that breakage of the relatively brittle tungsten carbide is due to the crowding effect of the chips released at the center of the tool. It is possible that a contributing factor is the differential velocity of the cutting edge of the insert at the "small radius" and "large radius" positions. In any event, by terminating the inner ends of the inserts in the present tool at a distance which is substantially spaced from the axis, the velocity of the cutting edge of each insert is more uniform and the condition of a "straight cut" is more nearly achieved.

It is, moreover, one of the features of the present invention that the number of cutting edges on the respective inserts is related by a low value integer to the number of cutting edges on the auxiliary cutter. In other words, the auxiliary cutter is provided with cutting edges which are related to the cutting edges of the inserts by a simple fraction of low order. Thus in the present tool only two cutting edges are provided on the auxiliary cutter whereas four inserts are used. By using only two auxiliary cutting edges such edges may be strongly supported by back-up ramps which extend over an angle which approaches 180°. Using an integrally reduced number of cutting edges on the auxiliary cutter not only increases its strength and durability, but the chip disposal grooves 61a, 62a may be of maximum size, a size more nearly matching the grooves 61, 62 ahead of the inserts.

With regard to the materials of which the auxiliary cutter is made, it is found that making the entire cutter of high-speed steel with the cutting edges suitably hardened provides a cutter which is both satisfactory and relatively inexpensive. Under such conditions it is anticipated that the cutting edges 41, 42 on the auxiliary cutter will be subject to more rapid wear than the cutting edges 25–28 on the inserts which are composed of the relatively harder tungsten carbide. When sharpening becomes necessary, it is a simple matter to release the set screws 51,55 which permits the auxiliary cutter to be removed for resharpening. In the event of stickage of the auxiliary cutter, the threaded plug 50 may be manually rotated to propel the auxiliary cutter endwise to a point where it may be gripped by a suitable tool and the withdrawal completed. After the edges 41,42 on the auxiliary cutter have been sharpened the cutter is reinserted and the threaded plug 50 is rotated into a position where the coplanar condition is achieved with the cutter bottomed on the plug, following which the set screws 51, 55 may be tightened. When the auxiliary cutter becomes used up it is a simple matter to replace it.

While it is preferred to employ an auxiliary cutter having a shank with a radius which corresponds substantially to the length of the individual cutting edges 41, 42, and with the inner ends of the carbide inserts extending to the central bore, it will be apparent that this relationship need not be precisely adhered to in order to practice the present invention and, if desired, the length of the cutting edges 41, 42 may slightly exceed the radius of the bore. This permissible variation is contemplated by the term "substantially" employed in the claims.

What I claim is:

1. In a face mill for use in a contouring machine in which the axis of the tool is rocked simultaneously with advancement of the tool along a generated convex surface to maintain perpendicularity with such surface, the combination comprising a tool body of cylindrical shape having an axial shank for chucking purposes and having an end face, a central bore in the end face, evenly spaced sockets in the end face having cutter inserts mounted therein presenting radial cutting edges which extend from the periphery of the tool inwardly to substantially the periphery of the bore, and auxiliary face type milling cutter secured in the bore having evenly spaced radial cutting edges which extend substantially from the periphery of the bore inwardly into the axis of the tool, the cutting edges of the inserts and the cutting edges of the auxiliary cutter all lying in a common plane which is perpendicular to the axis of the tool body.

2. The combination as claimed in claim 1 in which the number of cutting edges of the inserts is related by a low integer to the number of cutting edges on the auxiliary cutter is oriented so that the cutting edges thereof form substantial continuations of cutting edges on the inserts.

3. The combination as claimed in claim 1 in which the inserts are four in number and in which there are two cutting edges on the auxiliary cutter respectively aligned with cutting edges on diametrically arranged ones of the inserts.

4. The combination as claimed in claim 1 in which the body of the tool is formed with a groove ahead of each of the cutter inserts and in which the auxiliary cutter is formed with a groove ahead of each of the cutting edges thereon and means for holding the auxiliary cutter in such phase position with the tool body so that the grooves in one communicate respectively with grooves in the other for radial disposal of chips from the axial region of the tool.

5. The combination as claimed in claim 1 in which a threaded plug is recessed in the bore for bottomed seating of the auxiliary cutter for axial adjustment of the location of the cutting edges thereon into coplanar relationship with the cutting edges on the inserts, the auxiliary cutter having a keyed connection with the tool to resist cutting reaction and to maintain the auxiliary cutter in precise phase position with respect to the cutting edges on the inserts.

6. In a face mill for use in a contouring machine in which the axis of the tool is rocked simultaneously with advancement of the tool along a generated convex surface to maintain perpendicularity with such surface, the combination comprising a tool body of cylindrical shape having an axial shank for chucking purposes and having an end face, a central bore in the end face, evenly spaced sockets in the end face having cutter inserts mounted therein presenting radial cutting edges which extend inwardly toward the bore, an auxiliary face type milling cutter secured in the bore having evenly spaced radial cutting edges which extend substantially from the inner radius of the inserts to the axis of the tool, the cutting edges of the inserts and the cutting edges of the auxiliary cutter all lying in a common plane which is perpendicular to the axis of the tool body, a positioning plug threaded into the bore to serve as a back stop for the auxiliary cutter and to adjust the edges of the latter into coplanar relationship with the edges of the inserts, and means for keying the auxiliary cutter to the body of the tool and for holding the auxiliary cutter captive in the tool in its adjusted position.

7. The combination as claimed in claim 5 in which the radius of the shank of the auxiliary cutter is substantially equal to, or only slightly less than, the maximum radius of the cutting edges thereon.

* * * * *